US012590254B2

(12) United States Patent
Devers et al.

(10) Patent No.: US 12,590,254 B2
(45) Date of Patent: Mar. 31, 2026

(54) METHOD FOR HYDRODESULFURISATION OF A PETROLEUM FRACTION USING A CATALYST CONTAINING A GRAPHITIC MATERIAL CHARACTERISED BY THE H/C RATIO THEREOF

(71) Applicant: IFP Energies nouvelles, Rueil-Malmaison (FR)

(72) Inventors: Elodie Devers, Rueil-Malmaison (FR); Etienne Girard, Rueil-Malmaison (FR); Philibert Leflaive, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 285 days.

(21) Appl. No.: 18/036,541

(22) PCT Filed: Nov. 18, 2021

(86) PCT No.: PCT/EP2021/082170
§ 371 (c)(1),
(2) Date: May 11, 2023

(87) PCT Pub. No.: WO2022/112093
PCT Pub. Date: Jun. 2, 2022

(65) Prior Publication Data
US 2024/0010932 A1     Jan. 11, 2024

(30) Foreign Application Priority Data
Nov. 27, 2020     (FR) ....................................... 2012322

(51) Int. Cl.
| | |
|---|---|
| *C10G 45/00* | (2006.01) |
| *B01J 21/18* | (2006.01) |
| *B01J 23/882* | (2006.01) |
| *B01J 27/19* | (2006.01) |
| *B01J 35/61* | (2024.01) |
| *B01J 37/02* | (2006.01) |
| *B01J 37/20* | (2006.01) |
| *C10G 45/08* | (2006.01) |

(52) U.S. Cl.
CPC .............. *C10G 45/08* (2013.01); *B01J 21/18* (2013.01); *B01J 23/882* (2013.01); *B01J 27/19* (2013.01); *B01J 35/613* (2024.01); *B01J 35/615* (2024.01); *B01J 37/0201* (2013.01); *B01J 37/0236* (2013.01); *B01J 37/20* (2013.01); *C10G 2300/104* (2013.01); *C10G 2300/202* (2013.01); *C10G 2400/02* (2013.01)

(58) Field of Classification Search
CPC ...... B01J 35/613; B01J 35/615; B01J 35/647; B01J 35/635; B01J 37/0201; B01J 37/20; B01J 37/0236; B01J 27/19; B01J 23/882; B01J 21/18; C10G 45/06; C10G 45/08; C10G 2400/02; C10G 2300/1044; C10G 2300/104; C10G 2300/202

See application file for complete search history.

(56) References Cited

U.S. PATENT DOCUMENTS

| | | | |
|---|---|---|---|
| 2,793,170 A | 5/1957 | Stiles et al. | |
| 4,140,626 A | 2/1979 | Bertolacini et al. | |
| 4,774,220 A | 9/1988 | Chi-Lin | |
| 5,985,136 A | 11/1999 | Brignac et al. | |
| 6,896,795 B2 | 5/2005 | Didillon et al. | |
| 6,972,086 B2 | 12/2005 | Didillon et al. | |
| 7,347,931 B2 | 3/2008 | Uzio et al. | |
| 7,981,828 B2 | 7/2011 | Devers et al. | |
| 8,637,423 B2 | 1/2014 | Wu et al. | |
| 10,058,852 B2 | 8/2018 | Daudin | |
| 2009/0258780 A1 | 10/2009 | Toba et al. | |
| 2010/0133148 A1* | 6/2010 | Timmler .............. | B01J 37/0009 208/240 |
| 2022/0056348 A1 | 2/2022 | Devers et al. | |

FOREIGN PATENT DOCUMENTS

| | | | |
|---|---|---|---|
| EP | 0745660 A1 | 12/1996 | |
| EP | 2962753 A1 | 1/2016 | |
| FR | 3090006 A1 | 6/2020 | |

OTHER PUBLICATIONS

International search report PCT/EP2021/082170 dated Jan. 24, 2022 (pp. 1-4).

* cited by examiner

*Primary Examiner* — Prem C Singh
*Assistant Examiner* — Brandi M Doyle
(74) *Attorney, Agent, or Firm* — Csaba Henter; MILLEN, WHITE, ZELANO & BRANIGAN-

(57) ABSTRACT

The invention relates to a method for capturing organometallic impurities in a gasoline-type hydrocarbon feedstock containing sulfur compounds and olefins, wherein said feedstock is brought into contact with hydrogen and a capture mass comprising a nickel-based active phase, and a mesoporous and macroporous alumina substrate having a bimodal distribution of mesopores and wherein: —the volume of mesopores having a diameter greater than or equal to 2 nm and less than 18 nm corresponds to between 10 and 30% by volume of the total pore volume of said substrate; —the volume of mesopores with a diameter greater than or equal to 18 nm and less than 50 mm corresponds to between 30 and 50% by volume of the total pore volume of said substrate; the volume of macropores having a diameter greater than or equal to 50 nm and less than 8000 mm corresponds to between 30 and 50% by volume of the total pore volume of said substrate.

17 Claims, No Drawings

METHOD FOR HYDRODESULFURISATION OF A PETROLEUM FRACTION USING A CATALYST CONTAINING A GRAPHITIC MATERIAL CHARACTERISED BY THE H/C RATIO THEREOF

FIELD OF THE INVENTION

The present invention relates to a process for the hydrodesulfurization of a gasoline cut employing a catalyst containing a graphitic material characterized by its H/C ratio.

STATE OF THE ART

Sulfur is an element naturally present in crude oil and is thus present in gasoline and diesel fuel if it is not removed during refining. However, sulfur in gasoline interferes with the efficiency of emission reduction systems (catalytic converters) and contributes to air pollution. In order to combat environmental pollution, all countries are consequently gradually adopting strict sulfur specifications, the specifications being, for example, 10 ppm (weight) of sulfur in commercial gasolines in Europe, China, the United States and Japan. The problem of reducing sulfur contents is essentially focused on gasolines obtained by cracking, whether catalytic (FCC, Fluid Catalytic Cracking) or non-catalytic (coking, visbreaking, steam cracking) cracking, main precursors of sulfur in gasoline pools. One solution, well known to a person skilled in the art, for reducing the sulfur content consists in carrying out a hydrotreating (or hydrodesulfurization) of the hydrocarbon cuts (and in particular of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is linked in particular to the hydrogenation of the olefins present in this type of gasoline concomitantly with the hydrodesulfurization. Unlike other hydrotreating processes, in particular those for feedstocks of gas oil type, the hydrodesulfurization of gasolines thus has to make it possible to respond to a double antagonistic constraint: to provide extreme hydrodesulfurization of gasolines and to limit the hydrogenation of the unsaturated compounds present.

The most widely used route for responding to the double problem mentioned above consists in employing processes in which the sequence of unit stages makes it possible simultaneously to maximize the hydrodesulfurization while limiting the hydrogenation of the olefins. Thus, the most recent processes, such as the Prime G+ (trademark) process, make it possible to desulfurize cracked gasolines rich in olefins, while limiting the hydrogenation of the mono-olefins and consequently the loss of octane and the high hydrogen consumption which results therefrom. Such processes are, for example, described in the patent applications EP 1 077 247 and EP 1 174 485.

Obtaining the desired reaction selectivity (ratio of hydrodesulfurization to hydrogenation of olefins) can thus be partly due to the choice of the process but, in all cases, the use of an intrinsically selective catalytic system is very often a key factor. In general, the catalysts used for this type of application are catalysts of sulfide type containing an element from group VIb (Cr, Mo, W) and an element from group VIII (Fe, Ru, Os, Co, Rh, Ir, Pd, Ni, Pt). Such catalysts are, for example, disclosed in the documents U.S. Pat. Nos.

5,985,136, 4,140,626, 4,774,220, 8,637,423 and EP 1 892 039, which describe selective hydrodesulfurization catalysts.

There thus exists today a keen interest among refiners for a process for the hydrodesulfurization of gasoline cuts which exhibits catalytic performance qualities which are maintained in terms of catalytic activity while significantly improving the selectivity.

It is known that the presence of carbon in a catalyst for the hydrodesulfurization of a gasoline cut can improve the selectivity. Thus, the document U.S. Pat. No. 2,793,170 describes a process for the hydrodesulfurization of a cracked gasoline in the presence of a catalyst containing between 0.2% and 6% by weight of carbon. The document FR 2 850 299 describes a process for the hydrodesulfurization of a cracked gasoline in the presence of a catalyst with a carbon content of less than or equal to 2.8% by weight.

The document EP 0 745 660 describes a process for the hydrodesulfurization of an olefinic gasoline cut using a catalyst coked beforehand at the surface, with a carbon content of between 3% and 10% by weight with respect to the weight of the catalyst and a C/H atomic ratio$\leq$0.7 (=H/C ratio$\geq$1.42) in the coke.

The document US2009/0258780 for its part describes that a catalyst containing a metal from group VIII, molybdenum (Mo), phosphorus and sulfur which is supported on a porous inorganic oxide support comprising a carbon-comprising material makes it possible to observe an increase in the selectivity in a process for the hydrodesulfurization of a gasoline. The carbon-comprising material must contain oxygen and is characterized by a carbon content of between 5% and 20% by weight, with respect to the weight of the support, an atomic ratio of the amount of hydrogen with respect to the amount of carbon H/C of 0.4 to 1.0, and an atomic ratio of the amount of oxygen with respect to the amount of carbon O/C of 0.1 to 0.6.

These last two documents show that not only the content but also the chemical nature of the carbon-comprising material seems to have an influence on the selectivity of the process.

The present invention thus relates to a process for the hydrodesulfurization of a gasoline cut, the object of which is to maintain the hydrodesulfurizing activity and to significantly improve the selectivity by employing a catalyst containing a graphitic material characterized by its H/C ratio and not containing oxygen.

Subject Matters of the Invention

The invention relates to a process for the hydrodesulfurization of a gasoline cut containing sulfur-comprising compounds and olefins, in which said gasoline cut, hydrogen and a catalyst are brought into contact, said process being carried out at a temperature of between 200° C. and 400° C., a total pressure of between 1 and 3 MPa, an hourly space velocity, defined as being the flow rate by volume of feedstock relative to the volume of catalyst, of between 1 and 10 h$^{-1}$ and a hydrogen/gasoline feedstock ratio by volume of between 100 and 1200 Sl/l, said catalyst comprising an oxide support, sulfur and an active phase comprising at least one metal from group VIb and at least one metal from group VIII, said catalyst additionally containing a graphitic material containing carbon and hydrogen, the carbon content, expressed as carbon element, being between 5% and 20% by weight, with respect to the weight of the catalyst, and the H/C atomic ratio being less than 1.4, said graphitic material not containing oxygen.

This is because it has been found that the use of a catalyst containing sulfur and a graphitic material with a relatively high carbon content and an H/C atomic ratio of less than 1.4 without containing oxygen makes it possible to observe a significant increase in the selectivity in a process for the selective hydrodesulfurization of a gasoline cut without, however, observing a loss in activity.

Specifically, without being committed to any theory, it seems that the presence of sulfur and of such a graphitic material in the catalyst facilitates the dispersion of the metals within the support, making it possible to avoid the phenomena of rise in pH classically observed in the absence of the graphitic material during the impregnation of the solution containing the metal precursors. The maintenance of a fairly low pH thus makes possible the presence of heteropolyanions to the detriment of monomolybdate and polymolybdate entities, said heteropolyanions promoting the sulfidation of the metal entities and the formation of more selective sulfide phases.

The use of the catalyst containing a graphitic material also makes it possible to avoid or attenuate thermal runaways during the hydrodesulfurization process, which is characterized by highly exothermic reactions.

According to an alternative form, the carbon content, expressed as carbon element, is between 10% and 15% by weight, with respect to the weight of the catalyst.

According to an alternative form, the sulfur content, expressed as sulfur element, is between 1% and 8% by weight, with respect to the weight of the catalyst.

According to an alternative form, the H/C atomic ratio is between 0.8 and 1.2.

According to an alternative form, the catalyst has a content of metal from group VIb of between 5% and 40% by weight, expressed as oxide of metal from group VIb, with respect to the total weight of the catalyst, and a content of metal from group VIII of between 1% and 10% by weight, expressed as oxide of metal from group VIII, with respect to the total weight of the catalyst.

According to an alternative form, the metal from group VIII to metal from group VIb molar ratio in the catalyst is between 0.1 and 0.8.

According to an alternative form, the specific surface of the catalyst is between 20 and 200 $m^2/g$.

According to an alternative form, the catalyst additionally comprises phosphorus at a content of between 0.1% and 20% by weight, expressed as $P_2O_5$, with respect to the total weight of the catalyst.

According to an alternative form, the catalyst additionally comprises an organic compound containing oxygen and/or nitrogen and/or sulfur.

According to this alternative form, the organic compound is chosen from a compound comprising one or more chemical functional groups chosen from a carboxyl, alcohol, thiol, thioether, sulfone, sulfoxide, ether, aldehyde, ketone, ester, carbonate, amine, nitrile, imide, oxime, urea or amide functional group or a compound including a furan ring or also a sugar, and more particularly the organic compound is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural, 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

According to an alternative form, the active phase of the catalyst is constituted by cobalt and molybdenum.

According to an alternative form, the catalyst is prepared according to a preparation process comprising the following stages:

a) at least one hydrocarbon and one sulfur-comprising compound are brought into contact with said oxide support, making it possible to form said graphitic material comprising carbon and hydrogen on the oxide support, b) then a compound comprising a metal from group VIb and a compound comprising a metal from group VIII, and optionally phosphorus and/or at least one organic compound comprising oxygen and/or nitrogen and/or sulfur, are brought into contact with said oxide support containing said graphitic material, so as to obtain a catalytic precursor, c) said catalytic precursor is dried at a temperature of less than 200° C., without subsequent calcination, so as to obtain a dried catalyst, d) the dried catalyst is optionally activated in the presence of a sulfiding agent.

According to another alternative form, the catalyst is an at least partially spent catalyst resulting from a hydrotreating process.

According to an alternative form, the gasoline is a catalytic cracking gasoline.

Definitions

Subsequently, the groups of chemical elements are given according to the CAS classification (CRC Handbook of Chemistry and Physics, published by CRC Press, editor-in-chief D. R. Lide, 81$^{st}$ edition, 2000-2001). For example, group VIII according to the CAS classification corresponds to the metals of columns 8, 9 and 10 according to the new IUPAC classification.

The term "specific surface" is understood to mean the BET specific surface ($S_{BET}$ in $m^2/g$) determined by nitrogen adsorption in accordance with the standard ASTM D 3663-78 established from the Brunauer-Emmett-Teller method described in the journal "*The Journal of the American Chemical Society*", 1938, 60, 309.

Total pore volume of the catalyst or of the support used for the preparation of the catalyst is understood to mean the volume measured by mercury porosimetry intrusion according to the standard ASTM D4284-83 at a maximum pressure of 4000 bar (400 MPa), using a surface tension of 484 dynes/cm and a contact angle of 140°. The wetting angle used was taken as equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur. In order to obtain better accuracy, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (approximately 0.2 MPa).

The contents of metals from group VIII and group VIb are measured by X-ray fluorescence.

The contents of metal from group VIb, of metal from group VIII and of phosphorus in the catalyst are expressed as oxides after correction for the loss on ignition of the catalyst sample at 550° C. in a muffle furnace for two hours. The loss on ignition is due to the loss of moisture. It is determined according to ASTM D7348.

DETAILED DESCRIPTION OF THE INVENTION

The invention relates to a process for the hydrodesulfurization of a gasoline cut containing sulfur-comprising compounds and olefins, in which said gasoline cut, hydrogen and a catalyst are brought into contact, said process being carried out at a temperature of between 200° C. and 400° C., a total pressure of between 1 and 3 MPa, an hourly space velocity, defined as being the flow rate by volume of feedstock relative to the volume of catalyst, of between 1 and 10 $h^{-1}$ and a hydrogen/gasoline feedstock ratio by volume of between 100 and 1200 Sl/l, said catalyst comprising an oxide support, sulfur and active phase comprising at least one metal from group VIb and at least one metal from group VIII, said catalyst additionally containing a graphitic material containing carbon and hydrogen, the carbon content, expressed as carbon element, being of between 5% and 20% by weight, with respect to the weight of the catalyst, and the H/C atomic ratio being less than 1.4, said graphitic material not containing oxygen.

The hydrodesulfurization process according to the invention makes it possible to transform the organosulfur compounds of a gasoline cut into hydrogen sulfide ($H_2S$) while limiting as much as possible the hydrogenation of the olefins present in said cut.

The hydrodesulfurization process comprises bringing the gasoline cut containing sulfur-comprising compounds and olefins into contact with the catalyst and hydrogen under the following conditions:

a temperature of between 200° C. and 400° C., preferably of between 230° C. and 330° C.;

at a total pressure of between 1 and 3 MPa, preferably of between 1.5 and 2.5 MPa;

an Hourly Space Velocity (HSV), defined as being the flow rate by volume of feedstock relative to the volume of catalyst, of between 1 and 10 $h^{-1}$, preferably of between 2 and 6 $h^{-1}$;

a hydrogen/gasoline feedstock ratio by volume of between 100 and 1200 Sl/l, preferably of between 150 and 400 Sl/l.

The catalytic hydrodesulfurization process can be carried out in one or more reactors in series of the fixed bed type or of the ebullated bed type. If the process is carried out by means of at least two reactors in series, it is possible to provide a device for the removal of the $H_2S$ from the effluent resulting from the first hydrodesulfurization reactor before treating said effluent in the second hydrodesulfurization reactor. The operating conditions in the two reactors may or may not be identical.

Feedstock to be Treated

The process according to the invention makes it possible to treat any type of gasoline cut containing sulfur-comprising compounds and olefins, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracked gasoline). Said feedstock is preferably constituted by a gasoline cut resulting from a catalytic cracking unit.

The feedstock is advantageously a gasoline cut containing sulfur-comprising compounds and olefins and has a boiling point of between 30° C. and less than 250° C., preferably between 35° C. and 240° C. and in a preferred way between 40° C. and 220° C.

The sulfur content of the gasoline cuts produced by catalytic cracking (FCC) depends on the sulfur content of the feedstock treated by the FCC, on the presence or not of a pretreatment of the feedstock of the FCC, and also on the end point of the cut. Generally, the sulfur contents of the whole of a gasoline cut, in particular those originating from FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, including generally less than 300 ppm of mercaptans. The mercaptans are generally concentrated in the light fractions of the gasoline and more specifically in the fraction, the boiling point of which is less than 120° C. It should be noted that the sulfur-comprising compounds present in the gasoline can also comprise heterocyclic sulfur-comprising compounds, such as, for example, thiophenes, alkylthiophenes or benzothiophenes.

Preferably, the gasoline treated by the process according to the invention is a heavy gasoline (or HCN for Heavy Cracked Naphtha) resulting from a distillation stage targeted at separating a broad cut of the gasoline resulting from a cracking process (or FRCN for Full Range Cracked Naphtha) into a light gasoline (LCN for Light Cracked Naphtha) and a heavy gasoline HCN. The cut point of the light gasoline and of the heavy gasoline is determined in order to limit the sulfur content of the light gasoline and to make it possible to use it in the gasoline pool, preferably without additional post-treatment.

Advantageously, the broad FRCN cut is subjected to a selective hydrogenation stage described below before the distillation stage so as to at least partially hydrogenate the diolefins and to carry out a reaction for increasing the molecular weight of a part of the sulfur-comprising compounds.

To this end, the broad FRCN cut is sent to a selective hydrogenation catalytic reactor containing at least one fixed or moving bed of catalyst for the selective hydrogenation of the diolefins and for increasing the molecular weight of the mercaptans. The reaction for the selective hydrogenation of the diolefins and for increasing the molecular weight of the mercaptans is preferentially carried out on a sulfided catalyst comprising at least one element from group VIII and optionally at least one element from group VIb and an oxide support. The element from group VIII is preferably chosen from nickel and cobalt and in particular nickel. The element from group VIb, when it is present, is preferably chosen from molybdenum and tungsten and very preferably molybdenum. The oxide support of the selective hydrogenation catalyst is preferably chosen from alumina, nickel aluminate, silica, silicon carbide or a mixture of these oxides. Use is preferably made of alumina and more preferably still of high-purity alumina. According to a preferred embodiment, the selective hydrogenation catalyst contains nickel at a content by weight of nickel oxide (in NiO form) of between 1% and 12%, and molybdenum at a content by weight of molybdenum oxide (in $MoO_3$ form) of between 6% and 18% and a nickel/molybdenum molar ratio of between 0.3 and 2.5, the metals being deposited on a support constituted by alumina and for which the degree of sulfidation of the metals constituting the catalyst is greater than 50%.

During the optional selective hydrogenation stage, gasoline is brought into contact with the catalyst at a temperature of between 50° C. and 250° C., preferably between 80° C. and 220° C. and more preferably still between 90° C. and 200° C., with a liquid space velocity (LHSV) of between 0.5 $h^{-1}$ and 20 $h^{-1}$, the unit of the liquid space velocity being the liter of feedstock per liter of catalyst and per hour (l/l·h). The pressure is between 0.4 MPa and 5 MPa, preferably between 0.6 and 4 MPa and more preferably still between 1 and 2 MPa. The optional selective hydrogenation stage is typically carried out with a $H_2$/gasoline feedstock ratio of between 2 and 100 $Sm^3$ of hydrogen per $m^3$ of feedstock, preferably between 3 and 30 $Sm^3$ of hydrogen per $m^3$ of feedstock.

Catalyst

The catalyst of the process according to the invention comprises an oxide support, sulfur and an active phase comprising at least one metal from group VIb and at least one metal from group VIII, said catalyst additionally containing a graphitic material. It can also comprise phosphorus and/or sulfur and/or an organic compound as described below.

The oxide support of said catalyst of the process according to the invention is usually a porous solid chosen from the group consisting of: aluminas, silica, silica-aluminas and also titanium oxides or magnesium oxides, used alone or as a mixture with alumina or silica-alumina.

The oxide support advantageously exhibits a total pore volume of between 0.1 and 1.5 ml/g, preferably between 0.4 and 1.1 ml/g.

The oxide support advantageously exhibits a specific surface of between 5 and 400 $m^2·g^{-1}$, preferably between 10 and 350 $m^2·g^{-1}$, more preferably between 40 and 350 $m^2·g^{-1}$.

It is preferably chosen from the group constituted by: silica, the family of the transition aluminas and silica-aluminas; very preferably, the oxide support is essentially constituted by at least one transition alumina, that is to say that it comprises at least 51% by weight, preferably at least 60% by weight, very preferably at least 80% by weight, indeed even at least 90% by weight, of transition alumina. It preferably consists solely of a transition alumina. Preferably, the oxide support of said catalyst of the process according to the invention is a γ-phase alumina.

In another preferred case, the oxide present in the support of said catalyst of the process according to the invention is a silica-alumina containing at least 50% by weight of alumina, with respect to the total weight of the composite support. The silica content in the support is at most 50% by weight, with respect to the total weight of the support, generally less than or equal to 45% by weight, preferably less than or equal to 40%.

Sources of silicon are well known to a person skilled in the art. Mention may be made, by way of example, of silicic acid, silica in the powder form or in the colloidal form (silica sol), or tetraethyl orthosilicate $Si(OEt)_4$.

When the support for said catalyst is based on silica, it contains more than 50% by weight of silica, with respect to the total weight of the support, and, generally, it contains only silica.

According to a particularly preferred alternative form, the support consists of alumina, silica or silica-alumina.

The support is advantageously provided in the form of beads, extrudates, pellets or irregular and nonspherical agglomerates, the specific shape of which can result from a crushing stage.

The active phase of the catalyst comprises at least one metal from group VIb and at least one metal from group VIII. The metal from group VIb present in the active phase of the catalyst is preferentially chosen from molybdenum and tungsten. The metal from group VIII present in the active phase of the catalyst is preferentially chosen from cobalt, nickel and the mixture of these two elements. The active phase of the catalyst is preferably chosen from the group formed by the combination of the elements nickel-molybdenum, cobalt-molybdenum and nickel-cobalt-molybdenum and very preferably the active phase consists of cobalt and molybdenum.

The content of metal from group VIII is between 1% and 10% by weight, expressed as oxide of metal from group VIII with respect to the total weight of the catalyst, preferably between 1.5% and 9% by weight and preferably between 2% and 8% by weight. When the metal is cobalt or nickel, the metal content is expressed as CoO or NiO respectively.

The content of metal from group VIb is between 5% and 40% by weight, expressed as oxide of metal from group VIb with respect to the total weight of the catalyst, preferably between 8% and 35% by weight, very preferably between 10% and 30% by weight. When the metal is molybdenum or tungsten, the metal content is expressed as $MoO_3$ or $WO_3$ respectively.

The metal from group VIII to metal from group VIb molar ratio in the catalyst is preferentially between 0.1 and 0.8, preferably between 0.15 and 0.6 and more preferably still between 0.15 and 0.45.

The catalyst of the process according to the invention comprises a graphitic material containing carbon and hydrogen, said graphitic material not containing oxygen.

Graphitic material containing carbon and hydrogen is understood to mean a material resulting from a carbonization of one or more hydrocarbon compound(s) not containing oxygen. The graphitic material can also be coke formed on the catalyst during its use in a hydrotreating process beforehand. It should be noted that the term "graphitic material" in the present application denotes a substance based on hydrocarbons which is deposited on the surface of the catalyst or of the oxide support during its use, which is highly cyclized and condensed and which has an appearance similar to graphite.

It is important to emphasize that the carbon and the hydrogen of the graphitic material are not (or are no longer) in the form of an organic molecule. However, the catalyst can contain, in addition to the graphitic material containing carbon and hydrogen, an organic compound (additive) as described below.

The carbon content, expressed as carbon element, is between 5% and 20% by weight, preferably between 7% and 18% by weight and very preferably between 10% and 15% by weight, with respect to the total weight of the catalyst.

The hydrogen to carbon atomic ratio is less than 1.4, preferably between 0.7 and 1.3 and in a preferred way between 0.8 and 1.2.

The carbon content of the catalyst refers to the carbon content of the catalyst without taking into account the carbon contained in a possible organic additive contained in said catalyst. To this end, the carbon content and the H/C atomic ratio are determined according to the ASTM D5373 method after pretreatment of the catalyst under a flow of dry air at 300° C. for 2 hours and a flow rate of 2 l/h/g.

The carbon content refers to the catalyst at the start of the hydrodesulfurization process. During the time of the process, the carbon content can increase due to the deposition of coke.

The catalyst of the process according to the invention also comprises sulfur.

The sulfur content in said catalyst is preferably between 1% and 8% by weight, expressed as sulfur element, preferably between 1% and 6% and very preferably between 2% and 5% by weight, with respect to the total weight of the catalyst.

The sulfur content of the catalyst refers to the total sulfur content of the catalyst introduced during the formation of the graphitic material (carbonization) or already contained in a spent catalyst, taking into account the sulfur contained in a possible organic additive contained in said catalyst or introduced by a possible activation (sulfidation). To this end, the sulfur content is determined according to the (conventional, that is to say without said pretreatment of the catalyst carried out for the measurement of the carbon content) ASTM D5373 method.

The catalyst of the process according to the invention can also comprise phosphorus as dopant. The dopant is an added element which in itself does not exhibit any catalytic nature but which increases the catalytic activity of the active phase.

The phosphorus content in said catalyst is preferably between 0.1% and 20% by weight, expressed as $P_2O_5$ with respect to the total weight of the catalyst, preferably between 0.2% and 15% by weight, expressed as $P_2O_5$, and very preferably between 0.3% and 6% by weight, expressed as $P_2O_5$.

The catalyst can also additionally comprise at least one organic compound containing oxygen and/or nitrogen and/or sulfur before sulfidation. Such additives are described subsequently.

When the organic compound is present, the total content of organic compound(s) containing oxygen and/or nitrogen and/or sulfur present in the catalyst is generally between 1% and 30% by weight, preferably between 1.5% and 25% by weight and more preferably between 2% and 20% by weight, with respect to the total weight of the catalyst.

The catalyst of the process according to the invention advantageously exhibits a total pore volume of greater than or equal to 0.15 ml/g, preferably of greater than or equal to 0.18 ml/g and particularly preferably of between 0.2 and 0.5 ml/g.

The catalyst of the process according to the invention is advantageously characterized by a specific surface of between 20 and 200 m²/g, preferably of between 30 and 180 m²/g, preferably of between 40 and 160 m²/g, very preferably of between 50 and 150 m²/g.

The catalyst of the process according to the invention is advantageously in the form of grains having a mean diameter of between 0.5 and 10 mm. The grains can have all the forms known to a person skilled in the art, for example the form of beads (preferably having a diameter of between 1 and 6 mm), of extrudates, of tablets or of hollow cylinders.

Preferably, the catalyst (and the support used for the preparation of the catalyst) are either in the form of extrudates with a mean diameter of between 0.5 and 10 mm, preferably between 0.8 and 3.2 mm, and with a mean length of between 0.5 and 20 mm, or in the form of beads with a mean diameter of between 0.5 and 10 mm, preferably between 1.4 and 4 mm. The term "mean diameter" of the extrudates is understood to mean the mean diameter of the circle circumscribed in the cross section of these extrudates. The catalyst can advantageously be presented in the form of cylindrical, multilobe, trilobe or quadrilobe extrudates. Preferably, its shape will be trilobe or quadrilobe. The shape of the lobes will be able to be adjusted according to all the known methods of the prior art.

Process for the Preparation of the Catalyst

The catalyst of the process according to the invention can be prepared according to any method for the preparation of a catalyst known to a person skilled in the art.

The catalyst of the process according to the invention can be prepared according to a preparation process comprising the following stages:

a) at least one hydrocarbon and one sulfur-comprising compound are brought into contact with said oxide support, making it possible to form said graphitic material comprising carbon and hydrogen on the oxide support, b) then a compound comprising a metal from group VIb and a compound comprising a metal from group VIII, and optionally phosphorus and/or at least one organic compound comprising oxygen and/or nitrogen and/or sulfur, are brought into contact with said oxide support containing said graphitic material, so as to obtain a catalytic precursor, c) said catalytic precursor is dried at a temperature of less than 200° C., without subsequent calcination, so as to obtain a dried catalyst.

d) the dried catalyst is optionally activated in the presence of a sulfiding agent.

Stage a) of bringing at least one hydrocarbon and one sulfur-comprising compound into contact with said oxide support, making it possible to form said graphitic material, can be carried out according to various alternative forms. The preparation of the oxide support containing the graphitic material can be carried out by carbonization of an oxide support by bringing said oxide support into contact with at least one hydrocarbon, chosen from olefins, dienes, mono- and polyaromatics, and a sulfur-comprising compound, generally in the presence of a gas flow containing a gas chosen from nitrogen or hydrogen.

A hydrocarbon is understood to mean a compound comprising, and preferably consisting of, carbon and hydrogen atoms. Said hydrocarbon in particular does not contain oxygen atoms.

According to a first alternative carbonization form, said graphitic material is formed by the method of chemical vapor deposition of olefinic and/or diene compounds.

According to this first alternative form, the graphitic material employed in the process according to the invention is prepared by a process comprising a stage of bringing a gas comprising nitrogen or hydrogen, a sulfur-comprising compound and one or more olefinic and/or diene hydrocarbons into contact with the oxide support at a temperature of between 500 and 900° C. and a pressure of between 0.05 and 10 MPa for a period of time of between 0.25 and 12 hours. Said sulfur-comprising compound can be $H_2S$ or a compound capable of decomposing to give $H_2S$, such as, for example, dimethyl disulfide. Said olefinic and/or diene hydrocarbon is a molecule containing one or more unsaturations, advantageously of olefin (ethylene, propylene, butene) or diene (isoprene, butadiene) type.

According to a second alternative carbonization form, said graphitic material is formed by reaction of one or more hydrocarbons chosen from mono- or polyaromatic compounds. According to this second alternative form, the graphitic material employed in the process according to the invention is prepared by a process comprising a stage of bringing a gas comprising nitrogen or hydrogen, a sulfur-comprising compound and one or more hydrocarbons containing at least one aromatic nucleus into contact with the oxide support at a temperature of between 300 and 600° C. and a pressure of between 0.05 and 10 MPa for a period of time of between 0.25 and 12 hours. Said sulfur-comprising compound can be $H_2S$ or a compound capable of decomposing to give $H_2S$, such as, for example, dimethyl disulfide. Said hydrocarbon is a molecule containing one or more aromatic nuclei, advantageously of monoaromatic (benzene, toluene, ortho-xylene, meta-xylene, para-xylene, tetralin) or diaromatic type.

According to a third alternative carbonization form, said graphitic material is formed by reaction of a hydrocarbon cut exhibiting at least 90% of the compounds, the boiling point of which is between 250° C. and 400° C. at atmospheric pressure.

This cut generally contains a mixture of several mono- or polyaromatic, olefinic and diene hydrocarbons. According to this third alternative form, the graphitic material employed in the process according to the invention is prepared by a process comprising a stage of bringing a gas comprising nitrogen or hydrogen, at least one sulfur-comprising compound and a hydrocarbon cut exhibiting at least 90% of the compounds, the boiling point of which is between 250° C. and 400° C. at atmospheric pressure, into contact with the oxide support at a temperature of between 300 and 600° C. and a pressure of between 0.05 and 15 MPa for a period of time of between 0.25 and 12 hours. Said sulfur compound can be $H_2S$ or a compound capable of decomposing to give $H_2S$, such as, for example, dimethyl disulfide, or any other sulfur-containing compound, such as thiophene, alkylthiophenes, benzothiophene, alkylbenzothiophenes, dibenzothiophene or alkyldibenzothiophenes. Said cut does not contain oxygen-comprising compounds.

According to stage b) of the process for the preparation of the catalyst used according to the process of the invention, a compound comprising a metal from group VIb and a compound comprising a metal from group VIII, and optionally phosphorus and/or at least one organic compound comprising oxygen and/or nitrogen and/or sulfur, are brought into contact with said oxide support containing the graphitic material.

The operation of bringing at least one compound comprising a metal from group VIb and at least one compound comprising a metal from group VIII into contact with said oxide support containing the graphitic material can advantageously be carried out by any technique known to a person skilled in the art, such as, for example, ion exchange, dry impregnation, excess impregnation, vapor phase deposition, and the like. The operation of bringing into contact can take place in one stage or in several successive stages. According to a preferred form, said contacting stage(s) is (are) carried out by the impregnation method described as "dry" well known to a person skilled in the art by bringing an impregnation solution containing a compound comprising a metal from group VIII and a compound comprising a metal from group VIb into contact with said oxide support containing the graphitic material.

The contacting operation advantageously involves a precursor of said metals.

Use may be made, by way of example, among the sources of molybdenum, of the oxides and hydroxides, molybdic acids and their salts, in particular the ammonium salts, such as ammonium molybdate or ammonium heptamolybdate, phosphomolybdic acid ($H_3PMo_{12}O_{40}$) and their salts, and optionally silicomolybdic acid ($H_4SiMo_{12}O_{40}$) and its salts. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to a person skilled in the art. For example, use may be made, among the sources of tungsten, of the oxides and hydroxides, tungstic acids and their salts, in particular the ammonium salts, such as ammonium tungstate or ammonium metatungstate, phosphotungstic acid and their salts, and optionally silicotungstic acid ($H_4SiW_{12}O_{40}$) and its salts. The sources of tungsten can also be any heteropolycompound of Keggin, lacunary Keggin, substituted Keggin or Dawson type, for example. Use is preferably made of the ammonium oxides and salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example.

Any impregnation solution described in the present invention can comprise any polar protic solvent known to a person skilled in the art. Preferably, use is made of a polar protic solvent, for example chosen from the group formed by methanol, ethanol and water. Preferably, the impregnation solution comprises a water-ethanol or water-methanol mixture as solvents in order to facilitate the impregnation of the compound containing a metal from group VIb and of the compound containing a metal from group VIII (and optionally of the phosphorus and/or of an organic compound such as described below) on the oxide support containing the graphitic material and which is thus partly hydrophobic. Preferably, the solvent used in the impregnation solution consists of a water-ethanol or water-methanol mixture.

According to another alternative form, the contacting stage b) can also comprise bringing the oxide support containing the graphitic material into contact with an impregnation solution containing phosphorus, in addition to the compound comprising a metal from group VIb and to the compound comprising a metal from group VIII.

The phosphorus to the element from group VIb molar ratio in the catalyst is greater than or equal to 0.05, preferably greater than or equal to 0.07, preferably between 0.08 and 1, preferably between 0.1 and 0.9 and very preferably between 0.15 and 0.6.

The preferred phosphorus precursor is orthophosphoric acid $H_3PO_4$ but its salts and esters, such as ammonium phosphates, are also suitable. The phosphorus can also be introduced at the same time as the element(s) from group VIb in the form of Keggin, lacunary Keggin, substituted Keggin or Strandberg-type heteropolyanions.

According to yet another alternative form, the contacting stage b) can also comprise bringing the oxide support containing the graphitic material into contact with an impregnation solution containing an organic compound containing oxygen and/or nitrogen and/or sulfur, in addition to the compound comprising a metal from group VIb, to the compound comprising a metal from group VIII and optionally to the phosphorus. The function of the additives or organic compounds is to increase the catalytic activity in comparison with the catalysts without additives. Said organic compound is preferentially impregnated on said catalyst after dissolution in aqueous or nonaqueous solution.

In this case, the molar ratio of the organic compound added per metal from group VIb in solution is between 0.01 and 5 mol/mol, preferably between 0.05 and 3 mol/mol, in a preferred way between 0.05 and 2 mol/mol and very preferably between 0.1 and 1.5 mol/mol.

When several organic compounds are present, the various molar ratios apply for each of the organic compounds present.

Generally, the organic compound is chosen from a compound comprising one or more chemical functional groups chosen from a carboxyl, alcohol, thiol, thioether, sulfone, sulfoxide, ether, aldehyde, ketone, ester, carbonate, amine, nitrile, imide, oxime, urea and amide functional group or a compound including a furan ring or also a sugar.

An oxygen-containing organic compound is understood here to mean a compound not comprising another heteroatom. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, oxalic acid, maleic acid, malic acid, malonic acid, oxalic acid, gluconic acid, tartaric acid, citric acid, $\gamma$-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, $\gamma$-valerolactone, 2-acetylbutyrolactone, propylene carbonate, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, ethyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate, 1,5-pentanediol, 3-methyl-1,5-pentanediol, 1,5-hexanediol, 3-ethyl-1,5-pentanediol, 2,4-diethyl-1,5-pentanediol, 5-methyl-2(3H)-furanone, butyl glycolate, ethyl 4-oxopentanoate, diethyl maleate, dimethyl maleate, dimethyl fumarate, diethyl fumarate, dimethyl adipate, dimethyl 3-oxoglutarate, dimethyl tartrate, diethyl tartrate, diisopropyl tartrate, di(tert-butyl) tartrate, dimethyl malate, diethyl malate, diisopropyl malate and dibutyl malate.

The nitrogen-containing organic compound can be one or more chosen from compounds comprising one or more chemical functional groups chosen from an amine or nitrile functional group. A nitrogen-containing organic compound is understood here to mean a compound not comprising another heteroatom. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine and a carbazole.

The oxygen- and nitrogen-containing organic compound can be one or more chosen from compounds comprising one or more chemical functional groups chosen from a carboxylic acid, alcohol, ether, aldehyde, ketone, ester, carbonate, amine, nitrile, imide, amide, urea or oxime functional group. An oxygen- and nitrogen-containing organic compound is understood here to mean a compound not comprising another heteroatom. By way of example, the oxygen- and nitrogen-containing organic compound can be one or more chosen from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, ethyl 2-mercaptopropanoate, methyl 3-(methylthio)propanoate and ethyl 3-(methylthio) propanoate.

Preferably, the organic compound contains oxygen; preferably, it is chosen from $\gamma$-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, $\gamma$-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

The impregnation stage comprises several embodiments. They are distinguished in particular by the moment at which the organic compound, when it is present, is introduced, which introduction can be carried out either at the same time as the impregnation of the metals (coimpregnation), or after (postimpregnation), or before (preimpregnation). In addition, it is possible to combine the embodiments.

Advantageously, after each impregnation stage, the impregnated support is left to mature. Maturation makes it possible for the impregnation solution to homogeneously disperse within the support.

Any maturation stage described in the present invention is advantageously carried out at atmospheric pressure, in a water-saturated atmosphere and at a temperature of between 17° C. and 50° C., and preferably at ambient temperature. Generally, a maturation time of between ten minutes and forty-eight hours and preferably of between thirty minutes and six hours is sufficient.

After stage b), a catalytic precursor is thus obtained which comprises the oxide support comprising the graphitic material, the active phase comprising at least one metal from group VIb and at least one metal from group VIII, sulfur, and optionally phosphorus and/or an organic compound containing oxygen and/or nitrogen and/or sulfur.

According to stage c) of the process for the preparation of the catalyst used according to the process of the invention, said catalytic precursor is dried at a temperature of less than 200° C., advantageously of between 50° C. and 180° C., preferably between 70° C. and 150° C., very preferably between 75° C. and 130° C., without subsequent calcination, so as to obtain a dried catalyst.

The drying stage is preferentially carried out under an inert atmosphere, typically under a nitrogen atmosphere.

The drying stage can be carried out by any technique known to a person skilled in the art. It is advantageously carried out at atmospheric pressure or at reduced pressure. Preferably, this stage is carried out at atmospheric pressure. It is advantageously carried out in a traversed bed using any hot inert gas. Preferably, when the drying is carried out in a fixed bed, the gas used is argon or nitrogen. Very preferably, the drying is carried out in a traversed bed in the presence of nitrogen. Preferably, the drying stage has a duration of between 5 minutes and 15 hours, preferably between 30 minutes and 12 hours.

According to an alternative form and advantageously when an organic compound is present, the drying is carried out so as to preferably retain at least 30% by weight of the organic compound introduced during an impregnation stage; preferably, this amount is greater than 50% by weight and more preferably still greater than 70% by weight, calculated on the basis of the carbon remaining on the catalyst.

The content of carbon originating from the organic compound can be determined by taking the difference between the carbon content measured according to ASTM D5373 with and without pretreatment of the catalyst dried under a flow of dry air at 300° C. for 2 hours and a flow rate of 2 l/h/g. This is because the carbon of the graphitic material exhibits a significantly higher decomposition temperature (generally about 400 to 450° C.) than that of the organic compound (generally about 100 to 200° C.).

It is important to emphasize that the catalyst, during its process of preparation, does not undergo calcination in order to preserve the graphitic material and, when it is present, at least in part, the organic compound in the catalyst. Calcination is understood here to mean a heat treatment under a gas containing air or oxygen at a temperature of greater than or equal to 200° C.

On conclusion of the drying stage, a dried catalyst is then obtained, which catalyst will be subjected to an optional activation (sulfidation) stage for its subsequent use in a process for the hydrodesulfurization of gasolines.

Thus, according to stage d) of the process for the preparation of the catalyst used according to the process of the invention, the dried catalyst is optionally activated in the presence of a sulfiding agent.

The sulfidation is preferably carried out in a sulforeducing medium, that is to say in the presence of $H_2S$ and of hydrogen. The sulfidation is carried out by injecting, onto the catalyst, a flow containing $H_2S$ and hydrogen, or else a sulfur-comprising compound capable of decomposing to give $H_2S$ in the presence of the catalyst and of hydrogen. Polysulfides, such as dimethyl disulfide (DMDS), are $H_2S$ precursors commonly used to sulfide catalysts. The temperature is adjusted in order for the $H_2S$ to react with the dried catalyst to form metal sulfides, such as, for example, $MoS_2$ and $Co_9S_8$. This sulfidation can be carried out in situ or ex situ (inside or outside the reactor) of the reactor of the process according to the invention at temperatures of between 200 and 600° C. and more preferentially between 300 and 500° C.

To be active, the metals must be substantially sulfided. An element is regarded as substantially sulfided when the molar ratio of sulfur (S) present on the catalyst to said element is at least equal to 50% of the theoretical molar ratio corresponding to the complete sulfidation of the element under consideration. The overall degree of sulfidation is defined by the following equation:

$$(S/element)_{catalyst} >= 0.5 \times (S/element)_{theoretical}$$

with:

(S/element) catalyst molar ratio of sulfur (S) to the element present on the catalyst (S/element) theoretical molar ratio of sulfur to the element corresponding to the complete sulfidation of the element to give sulfide.

This theoretical molar ratio varies according to the element under consideration:

$$(S/CO)_{theoretical} = 8/9$$

$$(S/Ni)_{theoretical} = 1/1$$

$$(S/Mo)_{theoretical} = 2/1$$

$$(S/W)_{theoretical} = 2/1$$

As the catalyst comprises several metals, the molar ratio of S present on the catalyst to the combined elements also has to be at least equal to 50% of the theoretical molar ratio corresponding to the complete sulfidation of each element to give sulfide, the calculation being carried out in proportion to the relative molar fractions of each element.

For example, for a catalyst comprising molybdenum and nickel with a respective molar fraction of 0.7 and 0.3, the minimum molar ratio (S/Mo+Ni) is given by the following relationship:

$$(S/Mo+Ni)_{catalyst} = 0.5 \times [(0.7 \times 2) + (0.3 \times 1)]$$

Very preferably, the degree of sulfidation of the metals will be greater than 70%.

According to another alternative form of the invention, the catalyst of the process according to the invention does not undergo a sulfidation stage, that is to say that the catalyst is not brought into contact with a sulfiding agent, before injection of the feedstock. In this case, the catalyst is activated (sulfided) by the sulfur contained in the feedstock to be desulfurized.

According to any other alternative form, the catalyst of the process according to the invention can be an at least partially spent catalyst. An at least partially spent catalyst is understood to mean a catalyst which exits from a hydrotreating process. The at least partially spent catalyst can result from a hydrotreating of any petroleum cut, such as a naphtha, kerosene, gas oil, vacuum distillate or residue cut. Hydrotreating is understood to mean reactions encompassing in particular hydrodesulfurization (HDS), hydrodenitrogenation (HDN) and hydrogenation of aromatics (HDA). It can also result from a hydrotreating of biomass or bio-oils. Preferably, the at least partially spent catalyst results from a process for the hydrodesulfurization of a sulfur-containing olefinic gasoline cut carried out under the conditions as described below.

Advantageously, the at least partially spent catalyst does not undergo regeneration, that is to say a heat treatment under a gas containing air or oxygen at a temperature of greater than 200° C. generally making it possible to incinerate the majority of the coke formed during the hydrotreating process in which it was previously used. It may have undergone a deoiling stage before its use in the process for the hydrodesulfurization of gasolines of the present invention. The deoiling stage generally comprises bringing the at least partially spent catalyst into contact with a stream of inert gas (that is to say essentially devoid of oxygen), for example in a nitrogen atmosphere or the like, at a temperature of between 300° C. and 400° C., preferably of between 300° C. and 350° C. The inert gas flow rate in terms of flow rate per unit volume of the catalyst is from 5 to 150 $Sl \cdot l^{-1} \cdot h^{-1}$ for 3 to 7 hours.

In an alternative form, the deoiling stage can be carried out by light hydrocarbons, by steam treatment or any other analogous process.

The deoiling stage makes it possible to remove the soluble hydrocarbons and thus to release the porosity of the at least partially spent catalyst necessary for the hydrodesulfurization.

This at least partially spent catalyst comprises said oxide support, sulfur, the active phase comprising at least one metal from group VIb and at least one metal from group VIII, optionally phosphorus, and said graphitic material containing carbon and hydrogen in the form of coke, said graphitic material not containing oxygen.

The contents of metals, sulfur, carbon and phosphorus of the at least partially spent catalyst are those indicated above. They are determined according to the same methods described above.

Optionally, the at least partially spent catalyst can additionally exhibit a low content of contaminants resulting from the treated feedstock, such as silicon, arsenic or chlorine. Preferably, the content of silicon (besides that possibly present on the catalyst) is less than 2% by weight and very preferably less than 1% by weight, with respect to the total weight of the at least partially spent catalyst.

Preferably, the arsenic content is less than 2000 ppm by weight and very preferably less than 500 ppm by weight, with respect to the total weight of the at least partially spent catalyst.

Preferably, the chlorine content is less than 2000 ppm by weight and very preferably less than 500 ppm by weight, with respect to the total weight of the at least partially spent catalyst.

EXAMPLES

Example 1—Preparation of a Catalyst A
(According to the Invention)

50 cm³ of an alumina support exhibiting a BET specific surface of 230 m²/g, a pore volume, measured by mercury porosimetry, of 0.78 ml/g and a mean pore diameter of 11.5 nm, defined as the median diameter by volume by mercury porosimetry, and which is provided in the "extrudate" form, are charged to a reactor of traversed bed type. The carbonization of the support is carried out with a feedstock composed of 20% by weight of toluene, 5.9% by weight of dimethyl disulfide and 74.1% by weight of hexane under the following conditions: T=350° C., HSV=4.5 h⁻¹, $P_{tot}$=60 bar (6 MPa), H₂/feedstock ratio by volume=150 Sl/l.

The carbonized support exhibits a water uptake volume of 0.5 ml/g. Cobalt, molybdenum and phosphorus are then added. The impregnation solution is prepared by dissolution, at 90° C., of molybdenum oxide (2.2 g, MoO₃>99.5%, Merck™), cobalt hydroxide (0.57 g, 95% Co(OH)₂, Merck™) and 85% by weight aqueous phosphoric acid (0.46 g, Merck™) in 4.7 ml of distilled water. After dry impregnation of 10 grams of carbonized support, the extrudates are left to mature in a water-saturated atmosphere at ambient temperature for 24 h and then they are dried at 90° C. for 16 hours. The dried catalyst thus obtained is denoted A. The final composition in metals of the catalyst, expressed in the form of oxides and relative to the weight of the dry catalyst, is then as follows: MoO₃=17.1+/−0.2% by weight, CoO=3.4+/−0.1% by weight and P₂O₅=2.2+/−0.1% by weight. The catalyst exhibits 4.3% by weight of S relative to the weight of the catalyst analyzed by CHNS analysis according to ASTM D5373, and 10.7% by weight of C relative to the weight of the catalyst with an H/C ratio=1.05 analyzed by CHNS analysis according to ASTM D5373, after pretreatment of the catalyst under a flow of dry air at 300° C. for 2 hours and a flow rate of 2 l/h/g.

Example 2—Preparation of a Catalyst B (not in Accordance)

50 cm³ of one and the same support as described in example 1 are charged to a reactor of traversed bed type. The carbonization of the support is carried out with a feedstock composed of 25% by weight of toluene, 5.9% by weight of dimethyl disulfide and 69.1% by weight of hexane under the following conditions: T=400° C., HSV=4.5 h⁻¹, $P_{tot}$=60 bar (6 MPa), H₂/feedstock ratio by volume=150 Sl/l.

The carbonized support exhibits a water uptake volume of 0.51 ml/g. Cobalt, molybdenum and phosphorus are then added. The impregnation solution is prepared by dissolution, at 90° C., of molybdenum oxide (2.2 g), cobalt hydroxide (0.57 g) and 85% by weight aqueous phosphoric acid (0.46 g) in 4.8 ml of distilled water. After dry impregnation of 10 g of carbonized support, the extrudates are left to mature in a water-saturated atmosphere at ambient temperature for 24 h and then they are dried at 90° C. for 16 hours. The dried catalyst thus obtained is denoted B. The final composition in metals of the catalyst, expressed in the form of oxides and relative to the weight of the dry catalyst, is then as follows: MoO₃=17.1+/−0.2% by weight, CoO=3.4+/−0.1% by weight and P₂O₅=2.2+/−0.1% by weight. The catalyst exhibits 4.2% by weight of S relative to the weight of the catalyst analyzed by CHNS analysis according to ASTM D5373, and 10.4% by weight of C relative to the weight of the catalyst with an H/C ratio=1.51 analyzed by CHNS analysis according to ASTM D5373, after pretreatment of the catalyst under a flow of dry air at 300° C. for 2 hours and a flow rate of 2 l/h/g.

Example 3—Preparation of a Catalyst C (not in Accordance)

50 cm³ of one and the same support as described in example 1 are charged to a reactor of traversed bed type. The carbonization of the support is carried out with a feedstock composed of 20% by weight of cyclohexene, 5.9% by weight of dimethyl disulfide and 74.1% by weight of hexane under the following conditions: T=350° C., HSV=4.5 h$^{-1}$, P$_{tot}$=60 bar (6 MPa), H$_2$/feedstock ratio by volume=150 Sl/l.

The carbonized support exhibits a water uptake volume of 0.77 ml/g. Cobalt, molybdenum and phosphorus are then added. The impregnation solution is prepared by dissolution, at 90° C., of molybdenum oxide (2.2 g), cobalt hydroxide (0.57 g) and 85% by weight aqueous phosphoric acid (0.46 g) in 7.3 ml of distilled water. After dry impregnation of 10 g of carbonized support, the extrudates are left to mature in a water-saturated atmosphere at ambient temperature for 24 h and then they are dried at 90° C. for 16 hours. The dried catalyst thus obtained is denoted C. The final composition in metals of the catalyst, expressed in the form of oxides and relative to the weight of the dry catalyst, is then as follows: MoO$_3$=17.1+/−0.2% by weight, CoO=3.4+/−0.1% by weight and P$_2$O$_5$=2.2+/−0.1% by weight. The catalyst exhibits 0.9% by weight of S relative to the weight of the catalyst analyzed by CHNS analysis according to ASTM D5373, and 1.4% by weight of C relative to the weight of the catalyst with an H/C ratio=1.12 analyzed by CHNS analysis according to ASTM D5373, after pretreatment of the catalyst under a flow of dry air at 300° C. for 2 hours and a flow rate of 2 l/h/g.

Example 4—Preparation of a Catalyst D (not in Accordance)

50 cm$^3$ of one and the same support as described in example 1 are charged to a reactor of traversed bed type. The carbonization of the support is carried out with a feedstock composed of 40% by weight of toluene, 5.9% by weight of dimethyl disulfide and 54.1% by weight of hexane under the following conditions: T=350° C., HSV=6 h$^{-1}$, P$_{tot}$=60 bar (6 MPa), H$_2$/feedstock ratio by volume=50 Sl/l.

The carbonized support exhibits a water uptake volume of 0.40 ml/g. Cobalt, molybdenum and phosphorus are then added. The impregnation solution is prepared by dissolution, at 90° C., of molybdenum oxide (2.2 g), cobalt hydroxide (0.57 g) and 85% by weight aqueous phosphoric acid (0.46 g) in 3.7 ml of distilled water. After dry impregnation of 10 g of carbonized support, the extrudates are left to mature in a water-saturated atmosphere at ambient temperature for 24 h and then they are dried at 90° C. for 16 hours. The dried catalyst thus obtained is denoted D. The final composition in metals of the catalyst, expressed in the form of oxides and relative to the weight of the dry catalyst, is then as follows: MoO$_3$=17.1+/−0.2% by weight, CoO=3.4+/−0.1% by weight and P$_2$O$_5$=2.2+/−0.1% by weight. The catalyst exhibits 1.6% by weight of S relative to the weight of the catalyst analyzed by CHNS analysis according to ASTM D5373, and 20.9% by weight of C relative to the weight of the catalyst with an H/C ratio=1.03 analyzed by CHNS analysis according to ASTM D5373, after pretreatment of the catalyst under a flow of dry air at 300° C. for 2 hours and a flow rate of 2 l/h/g.

Example 5—Preparation of a Catalyst E (not in Accordance)

2 g of phenol and 15 g of the same support as described in example 1 are mixed with 50 ml of water and 50 ml of ethanol in an autoclave. The system is sealed and then brought to 200° C. with a gradient of 8° C./min. The temperature is maintained for 10 h and the solid is filtered off. After washing with distilled water, the solid is dried in an oven at 100° C. for 10 h and then is pyrolyzed at 300° C. for 1 h in a tubular furnace as a traversed bed under a flow of nitrogen of 10 ml/min/g with a temperature gradient of 6° C./min. The sample is subsequently recovered and the process is repeated 5 consecutive times in order to obtain a mixed support.

The carbonized support exhibits a water uptake volume of 0.7 ml/g. Cobalt, molybdenum and phosphorus are then added. The impregnation solution is prepared by dissolution, at 90° C., of molybdenum oxide (2.2 g), cobalt hydroxide (0.57 g) and 85% by weight aqueous phosphoric acid (0.46 g) in 6.7 ml of distilled water. After dry impregnation of 10 g of carbonized support, the extrudates are left to mature in a water-saturated atmosphere at ambient temperature for 24 h and then they are dried at 90° C. for 16 hours. The dried catalyst thus obtained is denoted E. The final composition in metals of the catalyst, expressed in the form of oxides and relative to the weight of the dry catalyst, is then as follows: MoO$_3$=17.1+/−0.2% by weight, CoO=3.4+/−0.1% by weight and P$_2$O$_5$=2.2+/−0.1% by weight. The catalyst exhibits 1.0% by weight of 0 relative to the weight of the catalyst analyzed by CHNS analysis according to ASTM D5373, and 10.5% by weight of C relative to the weight of the catalyst with an H/C ratio=1.06 analyzed by CHNS analysis according to ASTM D5373, after pretreatment of the catalyst under a flow of dry air at 300° C. for 2 hours and a flow rate of 2 l/h/g.

Example 6—Evaluation of the Catalytic Performance Qualities of the Catalysts A, B, C, D and E A model feedstock representative of a catalytic cracking gasoline containing 10% by weight of 2,3-dimethylbut-2-ene and 0.33% by weight of 3-methylthiophene (i.e. 1000 ppm by weight of sulfur in the feedstock) is used for the evaluation of the catalytic performance qualities of the various catalysts. The solvent used is heptane.

The hydrodesulfurization reaction (HDS) is carried out in a fixed traversed bed reactor under a total pressure of 1.5 MPa, at 210° C., at HSV=6 h$^{-1}$ (HSV=flow rate by volume of feedstock/volume of catalyst) and an H$_2$/feedstock ratio by volume of 300 Sl/l, in the presence of 4 ml of catalyst. Prior to the HDS reaction, the catalyst is sulfided in situ at 350° C. for 2 hours under a flow of hydrogen containing 15 mol % of H$_2$S at atmospheric pressure.

Each of the catalysts is placed successively in said reactor. Samples are taken at different time intervals and are analyzed by gas chromatography so as to observe the disappearance of the reactants and the formation of the products.

The catalytic performance qualities of the catalysts are evaluated in terms of catalytic activity and of the selectivity. The hydrodesulfurization (HDS) activity is expressed from the rate constant for the HDS reaction of 3-methylthiophene (kHDS), standardized by the volume of catalyst introduced, and assuming first order kinetics with respect to the sulfur-comprising compound. The activity for hydrogenation of the olefins (HydO) is expressed from the rate constant for the hydrogenation reaction of 2,3-dimethylbut-2-ene, standardized by the volume of catalyst introduced, and assuming first order kinetics with respect to the olefin.

The selectivity of the catalyst is expressed by the standardized ratio of the rate constants kHDS/kHydO. The kHDS/kHydO ratio will increase as the catalyst becomes more selective. The values obtained are standardized by taking the catalyst A as reference (relative HDS activity and relative selectivity equal to 100). The performance qualities are thus the relative HDS activity and the relative selectivity.

TABLE 1

| Catalysts | Relative HDS activity | Relative selectivity |
|---|---|---|
| A (according to the invention) | 100 | 100 |
| B (comparative) | 99 | 82 |
| C (comparative) | 110 | 60 |
| D (comparative) | 75 | 101 |
| E (comparative) | 88 | 99 |

Among the four catalysts B, C, D and E, and taking the catalyst A as reference, only the catalyst A prepared according to the invention exhibits both a maintained activity in hydrodesulfurization and an increased selectivity in hydrogenation of olefins.

This improvement in selectivity of the catalysts is particularly advantageous in the case of use in a process for the hydrodesulfurization of gasoline containing olefins for which it is sought to limit as much as possible the loss of octane due to the hydrogenation of the olefins.

The invention claimed is:

1. A process for the hydrodesulfurization of a gasoline cut containing sulfur-comprising compounds and olefins, in which said gasoline cut, hydrogen and a catalyst are brought into contact, said process being carried out at a temperature of between 200° C. and 400° C., a total pressure of between 1 and 3 MPa, an hourly space velocity, defined as being the flow rate by volume of feedstock relative to the volume of catalyst, of between 1 and 10 $h^{-1}$ and a hydrogen/gasoline feedstock ratio by volume of between 100 and 1200 Sl/l, said catalyst comprising an oxide support, sulfur and an active phase comprising at least one metal from group VIb and at least one metal from group VIII, said catalyst additionally containing a graphitic material containing carbon and hydrogen, the carbon content, expressed as carbon element, being between 5% and 20% by weight, with respect to the weight of the catalyst, and the H/C atomic ratio being 0.8 to 1.2, said graphitic material not containing oxygen.

2. The process as claimed in claim 1, in which the carbon content, expressed as carbon element, is between 10% and 15% by weight, with respect to the weight of the catalyst.

3. The process as claimed in claim 1, in which the sulfur content, expressed as sulfur element, is between 1% and 8% by weight, with respect to the weight of the catalyst.

4. The process as claimed in claim 1, in which the H/C atomic ratio is 1.0 to 1.2.

5. The process as claimed in claim 1, in which the catalyst has a content of metal from group VIb of between 5% and 40% by weight, expressed as oxide of metal from group VIb, with respect to the total weight of the catalyst, and a content of metal from group VIII of between 1% and 10% by weight, expressed as oxide of metal from group VIII, with respect to the total weight of the catalyst.

6. The process as claimed in claim 1, in which the metal from group VIII to metal from group VIb molar ratio in the catalyst is between 0.1 and 0.8.

7. The process as claimed in claim 1, in which the specific surface of the catalyst is between 20 and 200 $m^2/g$.

8. The process as claimed in claim 1, in which the catalyst additionally comprises phosphorus at a content of between 0.1% and 20% by weight, expressed as $P_2O_5$, with respect to the total weight of the catalyst.

9. The process as claimed in claim 1, in which the catalyst additionally comprises an organic compound containing oxygen and/or nitrogen and/or sulfur.

10. The process as claimed in claim 1, in which the organic compound is chosen from a compound comprising one or more chemical functional groups chosen from a carboxyl, alcohol, thiol, thioether, sulfone, sulfoxide, ether, aldehyde, ketone, ester, carbonate, amine, nitrile, imide, oxime, urea or amide functional group or a compound including a furan ring or a sugar.

11. The process as claimed in claim 10, in which the organic compound is chosen from γ-valerolactone, 2-acetyl-butyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxy-ethyl 3-oxobutanoate, bicine, tricine, 2-furaldehyde (also known under the name furfural), 5-hydroxymethylfurfural, 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2 (3H) -furanone, 1-methyl-2-piperidinone, 4-aminobutanoic acid, butyl glycolate, ethyl 2-mercaptopropanoate, ethyl 4-oxopentano-ate, diethyl maleate, dimethyl maleate, dimethyl fumarate, diethyl fumarate, dimethyl adipate and dimethyl 3-oxoglu-tarate.

12. The process as claimed in claim 1, in which the active phase of the catalyst is constituted by cobalt and molybdenum.

13. The process as claimed in claim 1, in which the catalyst has been prepared according to a preparation process comprising the following stages:
   a) at least one hydrocarbon and one sulfur-comprising compound are brought into contact with said oxide support, forming said graphitic material comprising carbon and hydrogen on the oxide support,
   b) then a compound comprising a metal from group VIb and a compound comprising a metal from group VIII, and optionally phosphorus and/or at least one organic compound comprising oxygen and/or nitrogen and/or sulfur, are brought into contact with said oxide support containing said graphitic material, obtaining a catalytic precursor,
   c) said catalytic precursor is dried at a temperature of less than 200° C., without subsequent calcination, obtaining a dried catalyst,
   d) the dried catalyst is optionally activated in the presence of a sulfiding agent.

14. The process as claimed in claim 1, in which the catalyst is an at least partially spent catalyst resulting from a hydrotreating process.

15. The process as claimed in claim 1, in which the gasoline is a catalytic cracking gasoline.

16. The process as claimed in claim 1, in which the catalyst has not undergone regeneration.

17. The process as claimed in claim 1, in which the H/C atomic ratio is 1.03 to 1.12.

* * * * *